(12) United States Patent
Lundahl et al.

(10) Patent No.: US 12,353,622 B2
(45) Date of Patent: Jul. 8, 2025

(54) METHOD AND SYSTEM FOR IMPROVING PERFOMANCE OF AN EYE TRACKING SYSTEM

(71) Applicant: TOBII AB, Danderyd (SE)

(72) Inventors: Rickard Lundahl, Danderyd (SE); Daniel Johansson Tornéus, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 18/515,353

(22) Filed: Nov. 21, 2023

(65) Prior Publication Data
US 2024/0176418 A1    May 30, 2024

(30) Foreign Application Priority Data
Nov. 28, 2022 (SE) .................... 2251380-8

(51) Int. Cl.
| | |
|---|---|
| G06F 3/01 | (2006.01) |
| G06T 7/246 | (2017.01) |
| G06T 7/292 | (2017.01) |
| G06T 7/55 | (2017.01) |
| G06T 7/66 | (2017.01) |
| G06T 7/73 | (2017.01) |
| G06T 15/20 | (2011.01) |

(52) U.S. Cl.
CPC .............. *G06F 3/013* (2013.01); *G06T 7/248* (2017.01); *G06T 7/292* (2017.01); *G06T 7/55* (2017.01); *G06T 7/66* (2017.01); *G06T 7/74* (2017.01); *G06T 15/20* (2013.01); *G06T 2207/30201* (2013.01)

(58) Field of Classification Search
CPC . G06F 3/013; G06T 7/55; G06T 7/292; G06T 7/74; G06T 7/66; G06T 7/248; G06T 15/20; G06T 2207/30201; G06V 40/18; G06V 40/193; A61B 3/113; A61B 3/0016; A61B 3/0025; A61B 3/14; G02B 27/0093; G02B 2027/0187
See application file for complete search history.

(56) References Cited

U.S. PATENT DOCUMENTS

| | | | |
|---|---|---|---|
| 2015/0287206 A1* | 10/2015 | Ebisawa | G06T 7/593 382/154 |
| 2020/0124844 A1 | 4/2020 | Ortiz-Egea et al. | |
| 2021/0085174 A1 | 3/2021 | Kojima et al. | |
| 2022/0057862 A1 | 2/2022 | Miller et al. | |
| 2022/0254058 A1* | 8/2022 | Liu | G06V 40/193 |
| 2022/0319040 A1* | 10/2022 | Legerton | G06T 7/73 |

OTHER PUBLICATIONS

Swedish search report for Patent Application No. 2251380-8, completed on Jun. 27, 2023.

(Continued)

*Primary Examiner* — Stephen G Sherman
(74) *Attorney, Agent, or Firm* — Christopher Ignatius Moylan

(57) ABSTRACT

The present invention relates to a system and a method for determining an entrance pupil position of an eye of a user of an eye tracking system. The entrance pupil position is determined using a predetermined entrance pupil displacement model, which at least models the angular dependence of the refractive properties of a cornea of the eye.

19 Claims, 8 Drawing Sheets

(56) References Cited

OTHER PUBLICATIONS

C. Lu, P. Chakravarthula, K. Liu, X. Liu, S. Li and H. Fuchs, "Neural 3D Gaze: 3D Pupil Localization and Gaze Tracking based on Anatomical Eye Model and Neural Refraction Correction," 2022 IEEE International Symposium on Mixed and Augmented Reality (ISMAR), Singapore, Singapore, 2022, pp. 375-383, doi: 10.1109/ISMAR55827.2022.00053.
Barsingerhorn, Annemiek & Boonstra, Frouke & Goossens, Jeroen. (2017). Optics of the human cornea influence the accuracy of stereo eye-tracking methods: A simulation study. Biomedical Optics Express. 8. 712. 10.1364/BOE.8.000712.
Navarro R, Santamaría J, Bescós J. Accommodation-dependent model of the human eye with aspherics. J Opt Soc Am A. Aug. 1985;2(8):1273-81. doi: 10.1364/josaa.2.001273.
Fedtke C, Manns F, Ho A. The entrance pupil of the human eye: a three-dimensional model as a function of viewing angle. Optics Express. Oct. 11, 2010;18(21):22364-76. doi: 10.1364/OE.18.022364.
Jos J. Rozema, Pablo Rodriguez, Rafael Navarro, Marie-José Tassignon; "SyntEyes: A Higher-Order Statistical Eye Model for Healthy Eyes," Invest. Ophthalmol. Vis. Sci. 2016;57(2):683-691. https://doi.org/10.1167/iovs.15-18067.
European search report for Patent Application No. EP 23 20 7730, completed on Mar. 13, 2024.

\* cited by examiner

METHOD AND SYSTEM FOR IMPROVING PERFOMANCE OF AN EYE TRACKING SYSTEM

CROSS-REFERENCE TO RELATED APPLICATION

The present application claims priority to Swedish patent application No. 2251380-8, filed Nov. 28, 2022, entitled "Method and system for improving performance of an eye tracking system", and is hereby incorporated by reference in its entirety.

FIELD OF THE INVENTION

The present invention relates to a method and a system for improving the performance of eye tracking systems. In particular the invention relates to determining an entrance pupil of the human eye taking into account the optical properties of the cornea.

BACKGROUND OF THE INVENTION

Monitoring or tracking eye movements and gaze points have during recent years become important and widespread techniques. Eye tracking may be used in a manner that can be described as passive—to retrieve information about the position at which a user is looking which in turn may be used for analyzing the behavior and awareness of the person. Examples of studies utilizing eye tracking includes the usability of software and different types of interfaces, evaluations of home pages, advertising and advertisements, means for educating pilots in simulator surroundings, research in psychology, behavior science and human perception and diagnosis of various types of visual faults and illnesses.

Eye tracking may also be used in a manner that can be described as active or interactive—the information from the eye tracking system is actively used to affect the content and/or the presentation on the display the user is currently viewing. Applications for the interactive eye tracking technique range from aids for physically disabled persons to advanced gaming. An aiding product may for example facilitate that a physically disabled person may interact with a computer by the procedure that those objects on the monitor of the computer at which he is looking are activated. In gaming, the experience of the game can be very much enhanced by the procedures that the gaze of the user influences the rendering of images and to control objects used in the game. Of particular relevance are the technologies referred to as extended reality (XR) technologies, often utilizing a head mountable device, HMD, for improved user experience. XR applications include virtual reality (VR) where a person is completely immersed in a virtual environment provided by the HMD, augmented reality (AR) where a user has her real-world environment supplemented with a computer-generated overlay and mixed reality (MR) where the computer-generated overlay of AR is combined in a way that the computer-generated objects interact with the real world as seen by the user.

Most technologies utilizing eye tracking are based on a model of the human eye and a number of parameters describing the eye. One of the most important parameters is the entrance pupil which is the virtual image of the anatomical pupil, the actual physical aperture, as seen and refracted through the cornea. For an observer in front of another person, or the camera of an eye tracking system, the entrance pupil position of the other person's eye is where one intuitively considers the pupil to be when looking into their eye. In order to improve the performance of eye tracking systems and technologies dependent on eye tracking, method and systems that accurately can provide the true entrance pupil position is highly sought for. In addition, such methods and system must in many cases be fast and not too computational heavy since many applications are real time applications or games or simulations that are to be perceived be the user as occurring in real time.

"*Accommodation-dependent model of the human eye with aspherics*,", Navarro R., Santamaria J., Bescós J., J. Opt. Soc. Am. A 2(8), 1273-1281 (1985). 10.1364/JOSAA.2.001273 discloses a widely used schematic eye model, which will be referred to as "Navarro". This schematic eye model is utilized in for example "*The entrance pupil of the human eye: a three-dimensional model as a function of viewing angle.*" Fedtke, Cathleen et al. Optics express vol. 18,21 (2010): 22364-76. doi:10.1364/OE.18.022364 to model the appearance of the entrance pupil as a function of viewing angle and pupil size by raytracing. This publication will be referred to as "Fedtke".

SUMMARY OF THE INVENTION

The object of the invention is to provide a method and a system that contribute to an accurate determination of an entrance pupil position of an eye of a user of an eye tracking system.

This is achieved by the method as defined in claim 1, and by the eye tracking system as defined in claim 15.

According to one aspect of the invention a method of determining the entrance pupil position of an eye of a user of an eye tracking system is provided. The method relates to an eye tracking system comprising at least a first camera arranged to provide an image of the eye, and the method comprises the steps of:—determining an optical axis of the eye;—receiving an image from the first camera;—detecting an image pupil center from the received image;—determining a first estimate of the entrance pupil position in the eye using the detected image pupil center;—selecting a virtual viewpoint; and—calculating a viewpoint-adjusted entrance pupil position relating to the selected virtual viewpoint using at least the first estimate of the entrance pupil position, the optical axis of the eye and a predetermined entrance pupil displacement model, wherein the entrance pupil displacement model at least models the angular dependence of the refractive properties of a cornea of the eye.

According to one embodiment of the invention, the step of determining the first estimate of the entrance pupil position may comprise constructing a first camera ray from a first camera center through the entrance pupil as seen from the first camera by back projecting the detected image pupil center.

According to one embodiment of the invention, the eye tracking system may further comprise a second camera, the method may further comprise the steps of:—receiving a first image from the first camera (140) and receiving a second image from the second camera;—detecting a first image pupil center from the received first image and detecting a second image pupil center from the received second image;—determining a first estimate of the entrance pupil position using the first image pupil center and determining a second estimate of the entrance pupil position using the second image pupil center; and—calculating the viewpoint-adjusted entrance pupil position using the first and second estimates of the entrance pupil position, the optical axis of the eye and the predetermined entrance pupil displacement model.

According to one embodiment of the invention the step of determining a first and second estimate of the entrance pupil position may further comprise:—constructing a first camera ray associated with the first camera; and—constructing a second camera ray associated with the second camera, the rays constructed from the respective camera center through the entrance pupil as seen from respective camera by back projecting the image pupil center; and wherein the step of calculating the viewpoint-adjusted entrance pupil position may further comprise the substeps of:—introducing a first virtual camera associated with the first camera and/or introducing a second virtual camera associated with the second camera;—determining a virtual camera ray being one or both of the first and second camera rays displaced a first distance, $d_0$, $d_1$, respectively, wherein the first distance ($d_0$, $d_1$) is determined using the predetermined entrance pupil displacement model;—reconstructing the entrance pupil as seen from the first camera using the intersection between the first camera ray and the second virtual camera ray and/or reconstructing the entrance pupil as seen from the second camera using the intersection between the first camera ray and the first virtual camera ray, the displacement corresponding to the translation of the entrance pupil in changing the viewpoint between the first and the second cameras; and—calculating the viewpoint-adjusted entrance pupil position by adjusting the reconstructed entrance pupil with either one or both of a second distance, $a_0$, $a_1$, respectively, wherein the second distance is a relative displacement of the entrance pupil changing the viewpoint associated with the first camera or changing the entrance pupil in respect to viewpoint associated with the second camera to the selected viewpoint, the second distance ($a_0$, $a_1$) determined using the predetermined entrance pupil displacement model.

According to one embodiment of the invention, the step of determining a first estimate of the entrance pupil position may comprise:—constructing a first camera ray associated with the first camera, the ray constructed from the first camera center through the entrance pupil as seen from first camera by back projecting the image pupil center; and wherein the step of calculating the viewpoint-adjusted entrance pupil position comprises the substeps of:—introducing at least a first virtual camera associated with the first camera;—determining a second virtual camera ray being the optical axis displaced;—constructing a first virtual camera ray, the ray constructed from the first virtual camera displaced a first distance, $d_0$, from the first camera ray, if viewed from the perspective of the optical axis, wherein the first distance, $d_0$, correspond to a translation of the entrance pupil in changing the viewpoint from the first camera to a position along the optical axis, wherein further the first distance, $d_0$, is determined using the predetermined entrance pupil displacement model;—reconstructing the entrance pupil as seen from the perspective of the second virtual camera ray using the intersection between the first virtual camera ray and the second virtual camera ray; and—calculating a viewpoint-adjusted entrance pupil position by adjusting the reconstructed the entrance pupil as if viewed from the selected viewpoint, using the predetermined entrance pupil displacement model.

According to one embodiment of the invention the predetermined entrance pupil displacement model in addition to modelling the angular dependence of the refractive properties of the cornea may further be based on at least one of, or a combination of: variations in the cornea topography or radius, pupil size, changing accommodation, and pupil plane offset.

According to aspects of the invention the viewpoint-adjusted entrance pupil position may be utilized in an extended reality application, such as virtual or augmented reality application(s), for example it may be used for adjusting the position of a virtual camera used in 3D rendering. The viewpoint-adjusted entrance pupil position may also be utilized in other adjustable optical devices used in combination with the eye tracking system. The viewpoint-adjusted entrance pupil position may also be utilized as input for a further processing of the eye tracking signal.

According to one aspect of the invention, the viewpoint-adjusted entrance pupil position is utilized in image generation.

According to one aspect of the invention, the viewpoint-adjusted entrance pupil position may be utilized for adjusting the position of a virtual camera used in 3D rendering.

According to one aspect of the invention, the viewpoint-adjusted entrance pupil position may be utilized in adjusting at least one parameter in an adjustable optical device used in combination with the eye tracking system.

According to one aspect of the invention, the viewpoint-adjusted entrance pupil position may be utilized as an input for a further processing of an eye tracking signal.

According to one aspect of the invention, the method may further comprise the step of determining an eye relief distance using the viewpoint-adjusted entrance pupil position, the eye relief distance being the shortest distance between the part of the cornea being closest to a display and the display.

According to one aspect of the invention, a preferred eye relief distance can be provided in an eye tracking system and the method may further comprise the further steps of:—comparing the estimate of the eye relief distance determined using the viewpoint-adjusted entrance pupil position with the preferred eye relief distance;—generating instructions for adjusting the eye in relation to the display in order to approach the preferred eye relief distance; and—presenting (815) the instructions to the user in the form of a visual guide.

According to one aspect of the invention, a preferred eye relief distance may be provided in an eye tracking system and the method may comprise the further steps of:—comparing the estimate of the eye relief distance determined using the viewpoint-adjusted entrance pupil position with the preferred eye relief distance;—generating instructions for adjusting the eye in relation to the display in order to approach the preferred eye relief distance; and—automatically adjusting the eye-to-display distance.

According to one aspect of the invention an eye tracking system may be arranged to detect the motion of an eye of a user is provided. The eye tracking system may comprise at least a first camera arranged to provide an image of the eye and a control and processing unit, wherein the control and processing unit is configured to control the eye tracking system to perform the steps of the main method and embodiments of the method described above.

According to one aspect of the invention, a head mountable display suitable for extended reality (XR) applications comprising the eye tracking system is provided.

According to one aspect of the invention, a non-transitory computer readable medium is provided, the non-transitory computer readable medium may have stored thereon instructions that, when executed by one or more control and processing unit(s), cause the one or more control and processing unit(s) to execute a method of determining an entrance pupil position in an eye of a user of an eye tracking system, the steps of the main method and embodiments of the method described above.

According to the invention the entrance pupil position may be accurately determined. The method is computational effective and fast.

One advantage afforded by the present invention is that in XR applications the quality of the displayed images may be improved, in particular in view of rendering of 3D objects.

One further advantage is that the viewpoint-adjusted entrance pupil position may be utilized to determine the eye relief distance, for example, in operating a head mountable device.

In the following, the invention will be described in more detail, by way of example only, with regard to non-limiting embodiments thereof, reference being made to the accompanying drawings.

BRIEF DESCRIPTION OF THE DRAWINGS

FIG. 3a-b are a schematic illustrations of embodiments of the invention wherein FIG. 3a shows an eye tracking system and FIG. 3b shows a head mountable device comprising an eye tracking system;

DETAILED DESCRIPTION

Figure 1:
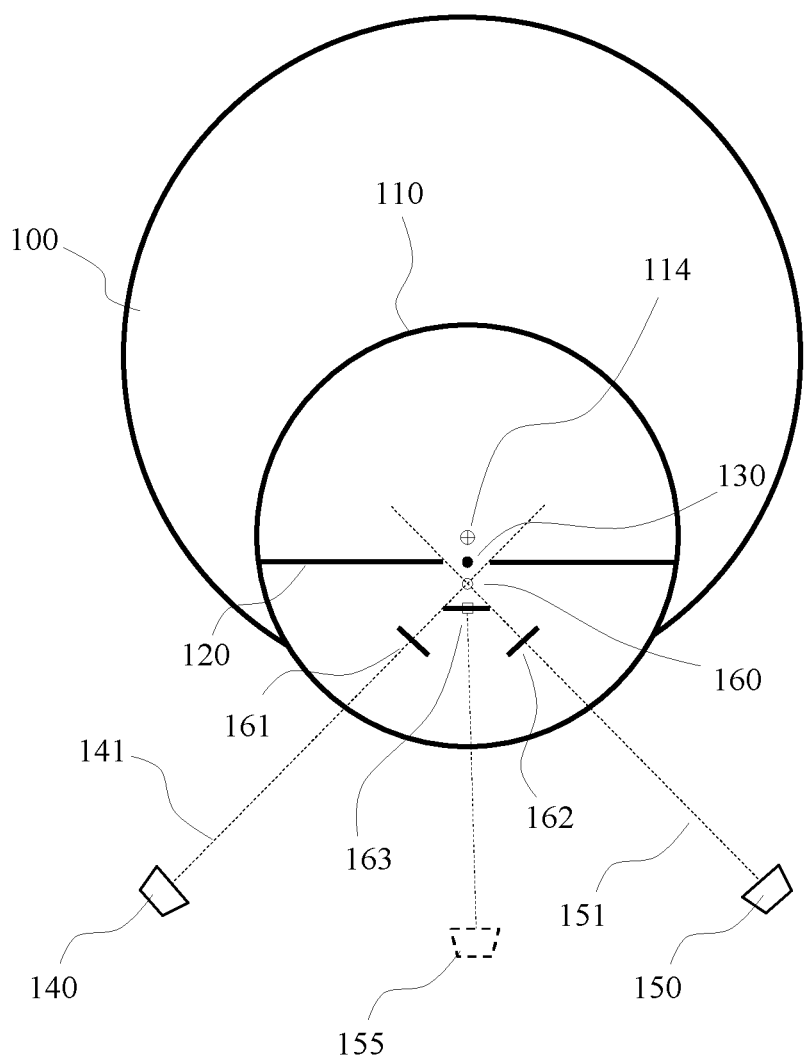
FIG. 1 is a schematic illustration of a prior art triangulation procedure.

In order to facilitate understanding of the present invention, a prior art stereo triangulation as used in computer vision implementations will be briefly described with reference to FIG. 1. FIG. 1 schematically illustrates an eye 100 with a cornea 110, an iris 120 and a pupil 130 and a simple triangulation system comprising a first calibrated camera 140 and a second calibrated camera 150. An optical axis may be ascribed to the eye and is composed of an imaginary line perpendicular to the cornea 100 that intersects the center of the pupil 130. In computer vision, "stereo triangulation" refers to the process of determining a point in space given its projections onto two images. This involves finding matching image points, constructing camera rays through the image points using camera poses and projective properties, and intersecting these rays. The first calibrated camera 140 and the second calibrated camera 150 are arranged to produce images of the eye or a portion of the eye, wherein an image pupil center may be identified. For the each of the first 140 and the second 150 calibrated camera, a ray 141, 151, respectively, is constructed from the camera center through an entrance pupil as seen from each camera by back projecting the identified corresponding image pupil center. The entrance pupil of the eye is a virtual image of the anatomical pupil, the actual physical aperture, as seen and refracted through the cornea. For an observer in front of another person, the entrance pupil of the other person's eye is where one intuitively considers the pupil to be when looking into their eye. The entrance pupil 160 as it would appear from a chosen viewpoint, or a virtual camera 155, is in this case approximated as the midpoint between the two points along the camera rays 141, 151 where the distance between the rays is the shortest. This approximation comes with a systematic error in the measurement stemming from the observation that the camera-pupil ray intersection 161 will differ from the entrance pupil as viewed from the virtual camera since each of the three cameras 140, 150, 155 observes a different entrance pupil 161, 162, 163. The magnitude of the systematic error depends on the relative geometry between the three cameras as well as on an optical axis of the eye relative to the three cameras. The optical axis is to be understood as an imaginary line perpendicular to the cornea that intersects the center of the entrance pupil. Due to the refractive properties of the cornea, the entrance pupil appears shifted forward and magnified (shown as reference number 163 in FIG. 1) as compared to the anatomical pupil center 130. The entrance pupil center point moves around slightly relative its position along the optical axis when viewed from straight ahead, for example in the direction from the virtual camera 155 toward the pupil 130, as compared to when viewed from different angles. In fact, the pupil image tilts, curves, and its center point moves when viewed from a peripheral angle. For a typical eye, the center moves about ~0.5 mm forward along the optical axis and ~0.1 mm in the pupil plane when viewed at a 50° angle from the optical axis. Hence, the entrance pupil position will depend on the viewpoint, also referred to as point of view or observation point and an exact measurement of the entrance pupil requires a definition of the viewpoint.

An illustration of the importance of establishing a correct entrance pupil position may be found in XR technologies. The entrance pupil center is the center of projection of the human eye. Existing XR systems assume a fixed position from where virtual content is rendered, which causes alignment and depth errors for the user of the XR system which may result in either a less realistic experience or fatigue and uncomfortable user experience. Therefore, improvements are needed in order to render virtual content more accurately with respect to alignment, shape and depth of rendered objects on a display of an eye tracking system, for example the XR system.

Figure 2:
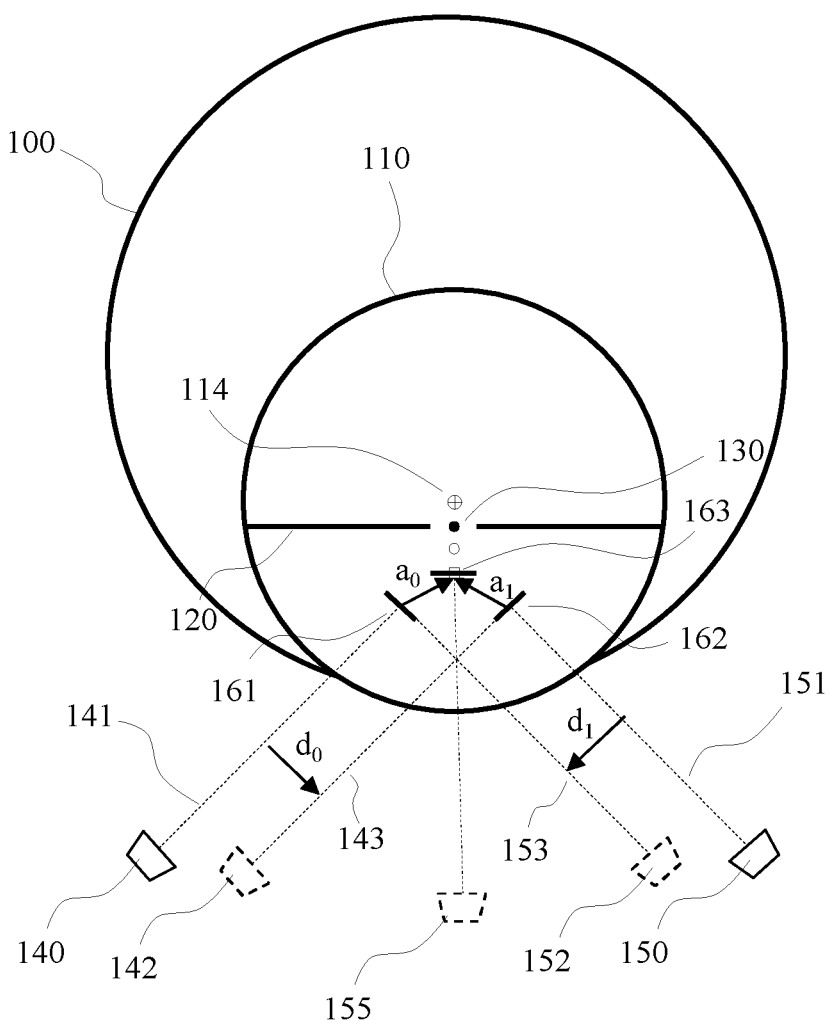
FIG. 2 is a schematic illustration of a triangulation procedure according to one embodiment of the present invention.

According to one aspect of the invention a method of determining an entrance pupil position is provided. The inventive method combines a triangulation procedure with using a predetermined entrance pupil displacement model which reflects the angular dependence of optical properties of the human eye. Thereby the performance of an eye tracking system may be improved. The entrance pupil displacement model utilized in the method and system according to the invention models the displacement of the entrance pupil position when moving from one viewpoint to another. The entrance pupil displacement model is arranged to provide an adjusted displacement as a function of viewing angle at least taking into account the refractive properties of the cornea. The entrance pupil displacement model may include other factors including, but not limited to variations in the cornea topography or radius, pupil size, changing accommodation, pupil plane offset (distance between pupil and cornea top). According to one embodiment the entrance pupil displacement model is parameterized to give a suitable approximation for a human population in terms of eye properties. According to one embodiment the entrance pupil displacement model is individually calibrated and parameterized to optimize the displacement for a particular person. The principal functions of the method according to the invention that modifies the triangulation procedure outlined in FIG. 1 is schematically illustrated in FIG. 2.

According to one embodiment, the entrance pupil displacement model is partly based on the model presented in "Fedtke" wherein the appearance of the entrance pupil is modeled as a function of viewing angle and pupil size by raytracing using Zemax software and the Navarro schematic eye model. The entrance pupil displacement model according to this embodiment calculates a displacement vector based on the viewing angle between the eye optical axis and the viewpoint and then applies three separate linear functions for each displacement vector component. In other embodiments, the entrance pupil displacement model does not necessarily need to have a linear relationship with respect to the viewing angle and/or the viewpoint, but rather can be implemented by any other mapping between the viewing angle and the viewpoint. The model is parameterized by minimizing an error on a set of randomized synthetically generated eye images with a known entrance pupil position. The displacement is zero for viewpoints along the optical axis. Changes due to pupil size or changing accommodation are not modelled in this embodiment, which makes the calculations fast and effective, yet the model has been shown to significantly improve the performance of eye tracking systems, for example in combination with XR.

Figure 3A:
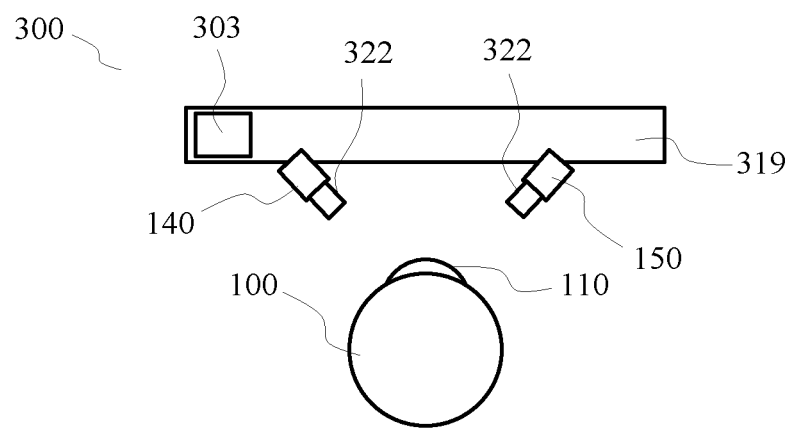

According to one aspect of the invention an eye tracking system implementing the method of invention, is provided. An eye tracking system 300 according to the invention is schematically illustrated in FIG. 3a. The eye tracking system 300 is here illustrated together with an eye 100 with a cornea 110 of a user using the eye tracking system. The eye tracking system 300 may be provided in a housing 319 as a separate unit or comprised in another unit such as an HMD. It will be appreciated that the abbreviation "HMD" may relate to both head mountable device and head-mounted displays, as commonly known in the art. The eye tracking system 300 comprises at least one camera 140 and optionally a second camera 150, both cameras directed towards the eye 100 and arranged to provide images of the pupil as seen from the respective camera. The cameras are arranged to provide an image of the eye 100 including the anatomical pupil as seen and refracted through the cornea 110 of the eye 100. The eye tracking system 300 may utilize pupil center corneal reflection, PCCR, to track the movement of the eye 100. The eye tracking system 300 is provided with one or more illuminators 322 which is/are arranged to illuminate the eye 100 of the user in order to generate glints, i.e. reflections that can be used by the eye tracking system 300 to detect a gaze direction of the user. The illuminators may for example be light emitting diodes (LEDs) emitting light in the infrared frequency band, or in the near infrared frequency band and which may be physically arranged in a variety of configurations. The described camera and illuminator arrangement is typically duplicated so that the eye tracking system 300 is arranged to simultaneously track both the eyes of the user, as depicted. The eye tracking system 300 further comprise a control and processing unit 303 in connection with the cameras 140; 150 and illuminators 322. The control and processing unit 303 may comprise or may be connected to, processing means, for example a CPU, I/O means and power supply means (not shown). The control and processing unit 303 is configured to control the eye tracking system 300 to perform the steps of the method according to the invention.

Figure 3B:
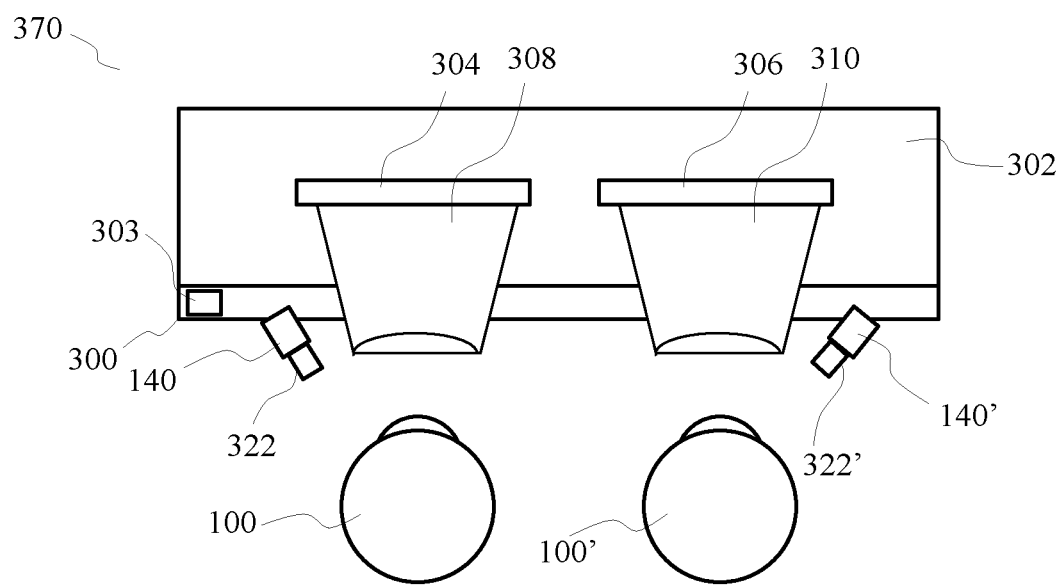

According to one aspect of the invention a display device comprising the eye tracking system according to the invention is provided. The device may be of the type with one display provided a distance away from the user or a head mounted display system. As a non-limiting example, a head mountable device, HMD, 370 is schematically illustrated in FIG. 3b. The HMD 370 comprises a housing 302 in which two displays 304, 306 are housed. The displays 304, 306 may be provided with respective optical assemblies 308, 310 through which a user can view the displays 304, 306. Each eye 100, 100' of the user can see one display 304, 306 through the respective optical assembly 308, 310, which optical assembly typically comprises one or more lenses. As an alternative, an HMD may include only a single display that is viewable by both eyes. In such a case, the display will typically include regions of the display that are visible to only one of the eyes, in order that a stereoscopic view is provided to the eyes. In the depicted embodiment, the eye tracking system 300 comprises two eye tracking cameras 140, 140' each one directed to track the movement of one of the eyes 100, 100' of the user. In another embodiment (not shown) two eye tracking cameras are provided for each eye 100, 100'. Each camera 140, 140' has associated illuminators 322, 322' which are arranged to illuminate the eye 100, 100' of the user in order to generate glints, i.e., reflections that can be used by the eye tracking system of the HMD 370 to detect a gaze direction of the user. Other methods and arrangements of eye tracking are also possible in place of PCCR, the options for which will be known to the skilled person in the context of the present application. The HMD 370 may further comprise, or may be connected to, processing means, for example a CPU, I/O means and power supply means (not shown). The HMD 370 may comprise a control and processing unit that incorporate the control and processing unit 303 of the eye tracking system 300. The head mountable device may for example be implemented in the form of a XR/VR device or XR/VR headset.

The method according to the invention is executed as part of the operation of the eye tracking system 300. As appreciated by the skilled person also other methods for example in form of functions, applications and drivers are typically needed for the operation, such being well known in the art. A representation of the entrance pupil displacement model may be accessible as a stored function or routine that the method will call upon. The method of determining the entrance pupil position is illustrated by the flowchart of FIG. 4 and comprises the main steps of:

405: Receiving an image from the first camera 140.
410: Detecting an image pupil center from the received image.
415: Determining a first estimate of the entrance pupil position in the eye 100 using the image pupil center.
420: Selecting a virtual viewpoint.
425: Calculating a viewpoint-adjusted entrance pupil position 163 relating to the selected virtual viewpoint using at least the first estimate of the entrance pupil position, determined optical axis of the eye and the predetermined entrance pupil displacement model, wherein the entrance pupil displacement model at least models the angular dependence of the refractive properties of the cornea 110.

Figure 4:
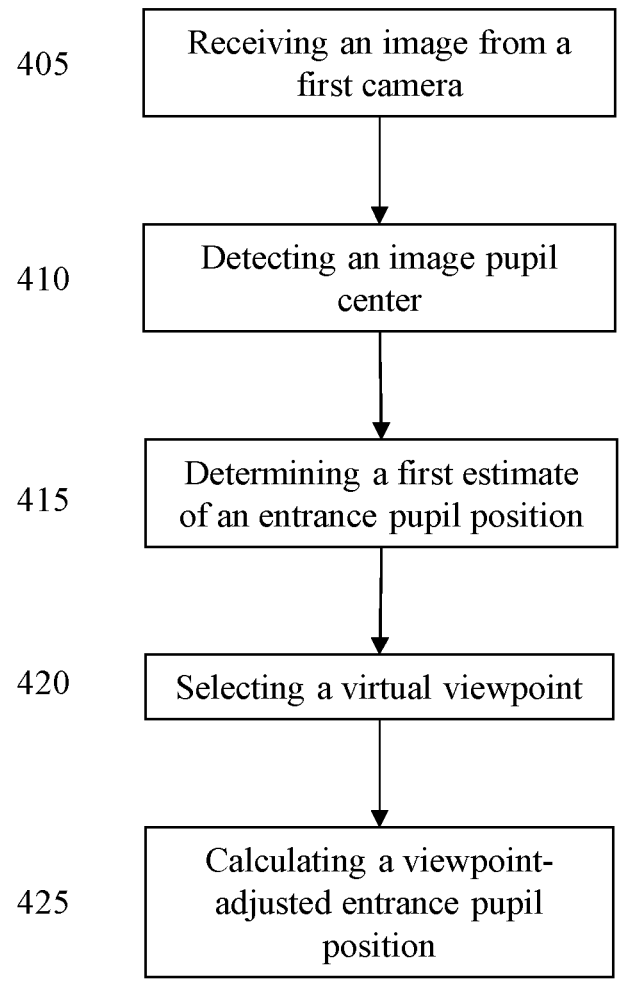
FIG. 4 is a flowchart of the method according to one embodiment of the present invention.

The optical axis is determined in step 402 (not shown in FIG. 4). The step of 415 determining a first estimate of the entrance pupil position is preferably performed by constructing a first camera ray 141 from the first camera center through the entrance pupil 161 as seen from the first camera 141 by back projecting the detected image pupil center.

Figure 5:
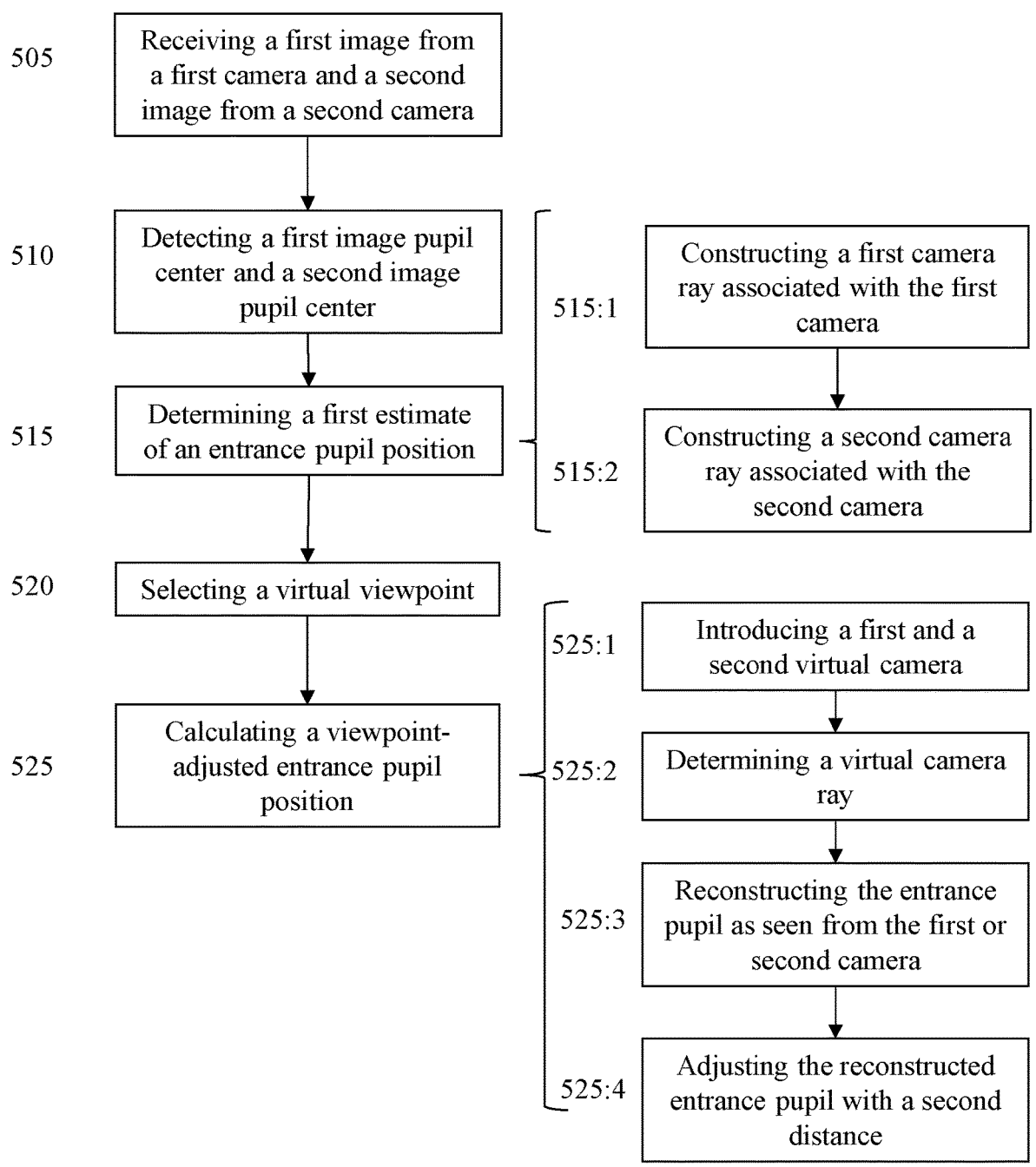
FIG. 5 is a flowchart of the method according to one embodiment of the present invention.

According to embodiments of the invention the method is implemented in an eye tracking system 300 comprising a first camera 140 and a second camera 150. The method of determining the entrance pupil position according to one embodiment is illustrated by the flowchart of FIG. 5 and the triangulation procedure schematically illustrated in FIG. 2 and comprises the steps of:

505: Receiving a first image from the first camera 140 and receiving a second image from the second camera 150.

510: Detecting a first image pupil center from the received first image and detecting a second image pupil center from the received second image.

515: Determining a first estimate of the entrance pupil position using the first image pupil center and determining a second estimate of the entrance pupil position using the second image pupil center. The first and second estimates of the entrance pupil position are preferably determined by:

515:1: Constructing a first camera ray 141 associated with the first camera 140.

515:2: Constructing a second camera ray 151 associated with the second camera 150, the rays constructed from the respective camera center through the entrance pupil as seen from respective camera by back projecting the image pupil center.

520: Selecting a virtual viewpoint 155.

525: Calculating the viewpoint-adjusted entrance pupil position 163 using the first and/or second estimates of the entrance pupil position and the entrance pupil displacement model. According to one embodiment the calculation comprises the substeps of:

525:1: Introducing a first virtual camera 142 associated with the first camera 140 and a second virtual camera 152 associated with the second camera 150.

525:2: Determining a virtual camera ray 143/153 being either the first camera ray 141 or the second camera ray 151 displaced a first distance, $d_0$ or $d_1$, respectively, wherein the first distance $d_0$, $d_1$ is determined using the predetermined entrance pupil displacement model.

525:3: Reconstructing the entrance pupil 161 as seen from the first camera 140 using the intersection between the first camera ray 141 and the second virtual camera ray 153 and/or reconstructing the entrance pupil 162 as seen from the second camera 150 using the intersection between the second camera ray 151 and the first virtual camera ray 143, the displacement corresponding to the translation of the entrance pupil in changing the viewpoint between the first and the second cameras.

525:4: Calculating a viewpoint-adjusted entrance pupil position 163 by adjusting the reconstructed entrance pupil with either one or both of a second distance, $a_0$, $a_1$, respectively, wherein the second distance $a_0$, $a_1$ is a relative displacement of the entrance pupil 161 changing the viewpoint associated with the first camera 140 or changing the entrance pupil 162 in respect to viewpoint associated with the second 150 camera to the selected viewpoint 155, the second distance $a_0$, $a_1$ determined using the predetermined entrance pupil displacement model.

Figure 6:
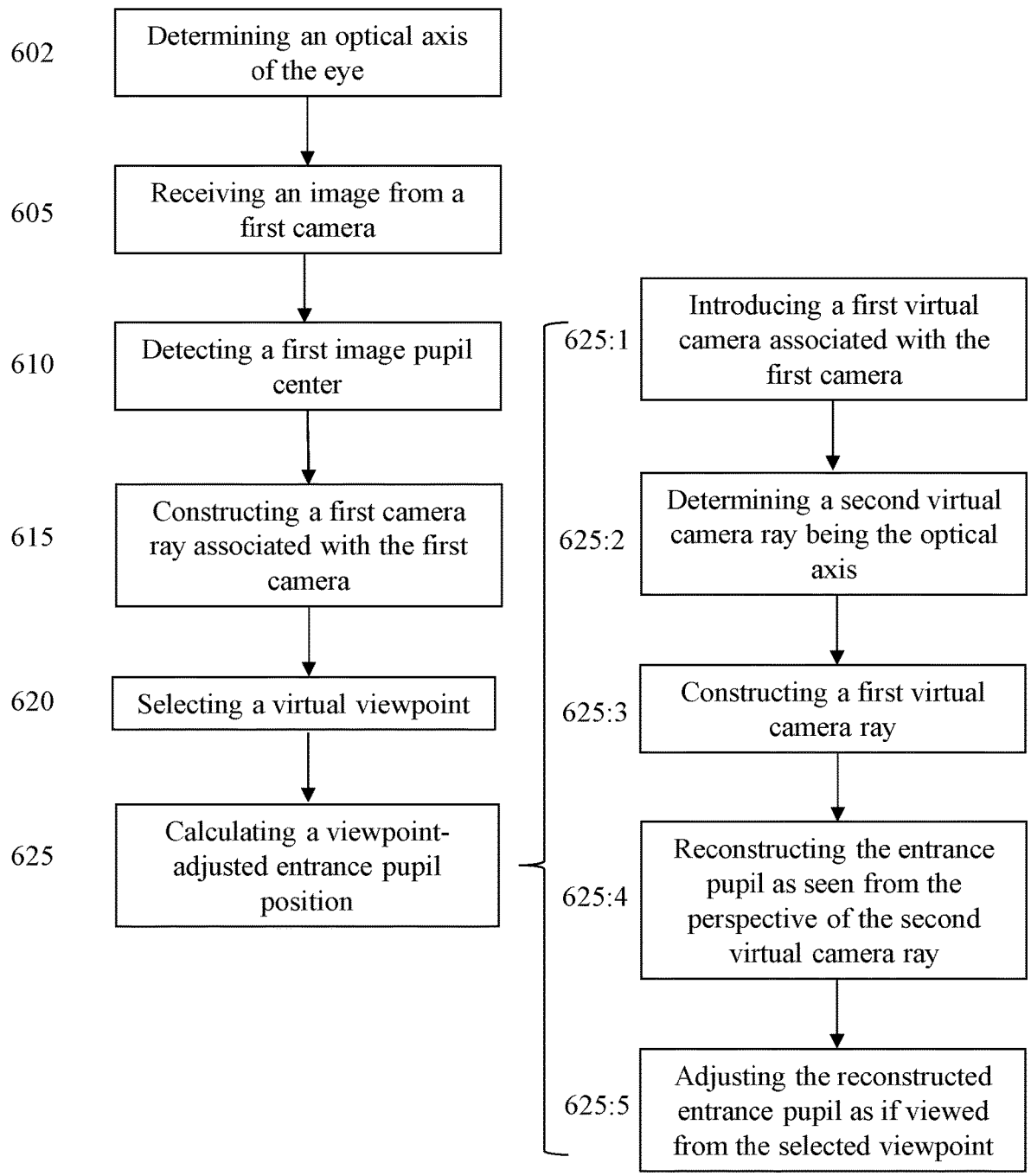
FIG. 6 is a flowchart of the method according to one embodiment of the present invention.

In the method according to one embodiment of the invention only a first camera 140 is utilized. The method may be implemented in an eye tracking system 300 comprising only one camera 140 or alternatively, the eye tracking system 300 may comprise two or more cameras but for the determination of viewpoint-adjusted entrance pupil only one camera is utilized. Using only one camera, the method according to the embodiment may on a high level be described as replacing one of the camera rays with the eye optical axis. However, if the triangulation baseline is narrow, that is, the eye optical axis is too close to the virtual direction given by the selected viewpoint it will be difficult to determine the viewpoint-adjusted entrance pupil. Preferably, an angle between the eye optical axis and the first camera ray 141 or camera own visual axis should be 10° or more in this embodiment. However, it should be noted that the invention is not limited to this specific range of angles. The method of determining the entrance pupil position according to this embodiment is illustrated by the flowchart of FIG. 6 and comprises the steps of:

602: Determining the optical axis of the eye 100.

605: Receiving an image from the first camera 140.

610: Detecting an image pupil center from the received image.

615: Constructing a first camera ray 141 associated with the first camera 140, the ray constructed from the first camera center through the entrance pupil as seen from first camera 140 by back projecting the image pupil center.

620: Selecting a virtual viewpoint 155.

625: Calculating a viewpoint-adjusted entrance pupil position 163 relating to the selected virtual viewpoint 155 using at least the first estimate of the entrance pupil position, the determined optical axis of the eye and a predetermined entrance pupil displacement model, wherein the entrance pupil displacement model at least models the angular dependence of the refractive properties of the cornea 110. According to one embodiment the calculation comprises the substeps of:

625:1: Introducing at least a first virtual camera 142 associated with the first camera 140.

625:2 Determining a second virtual camera ray 153 being the optical axis

625:3 Constructing a first virtual camera ray, the ray constructed from the first virtual camera 142 displaced a first distance, $d_0$, from the first camera ray 141, if viewed from the perspective of the optical axis, wherein the first distance, $d_0$, corresponds to a translation of the entrance pupil 161 in changing the viewpoint from the first camera 140 to a position along the optical axis, wherein further the first distance, $d_0$ is determined using the entrance pupil displacement model.

625:4 Reconstructing the entrance pupil 161 as seen from the perspective of the second virtual camera ray 153 using the intersection between the first virtual camera ray and the second virtual camera ray 153

625:4 Calculating a viewpoint-adjusted entrance pupil position 163 by adjusting the reconstructed the entrance pupil 161 as if viewed from the chosen viewpoint 155, using the entrance pupil displacement model.

The information received from the eye tracking system 300 including the optical axis and the image represent information commonly provided by an eye tracking system, as outlined above with reference to FIG. 3a.

According to embodiments of the invention the viewpoint-adjusted entrance pupil position is utilized in image generation, for example by adjusting the position of a virtual camera used in 3D rendering. The image generation is to be understood as for example, image rendering in virtual or augmented reality. This may typically be utilized in XR-applications and in devices primarily made for XR, for example an HMD 370 as outlined with reference to FIG. 3*b*. Further applications will be apparent to a skilled person.

According to embodiments of the invention the viewpoint-adjusted entrance pupil position is utilized in adjusting at least one parameter in an adjustable optical device used in combination with the eye tracking system 300. Similarly, the viewpoint-adjusted entrance pupil position may be used as an input or a constraint for a further eye tracking signal or further processing of an eye tracking signal, for example to determine the inter-pupilar-distance (IPD) of the user or to provide thresholding for any additional feature utilizing an eye tracking signal, such as gaze signal. A further use of the viewpoint-adjusted entrance pupil position may be used for lens distortion correction.

In many applications and devices an accurate determination of an eye relief is of importance, for example in XR applications utilizing an HMD 370 as outlined with reference to FIG. 3*b*, or any other VR/XR headset or a head-mountable device. The eye relief, ER, is the distance between the top of the cornea and the screen or other last surface of the optical assembly 308, 310 of the headset. The user's eye should be placed at a specific eye relief to obtain the widest possible viewing angle. If the user's eyes are positioned with a large eye relief, this will result in a reduced field of view, which deteriorates the user's experience. Providing a measurement of the eye relief enables the display system of the eye tracking system employed in the head-mountable device to guide the user to the correct eye relief or to adjust the eye relief automatically.

The disclosed elements in the figures may form part of a head-mountable device, HMD, i.e., a wearable headgear worn by the user or adapted to be arranged at a head of a user. For example, the HMD may comprise a display adapted for a virtual reality, VR, an augmented reality, AR, and/or a mixed reality, MR, application or collectively called an extended reality, XR, headset. The display may show a plurality of objects as a result of a control signal from a computer. The display may be transparent such that the user can also view the real world for AR experiences or non-transparent for VR experiences. For example, the display may be a three-dimensional (3D) display such as a stereoscopic display or a volumetric 3D display being either autostereoscopic or automultiscopic, which may indicate that they create 3D imagery visible to an unaided eye, without requiring stereo goggles or stereo head-mounted displays. Consequently, the 3D display may be part of the head-mountable device. It is also known that the head-mountable device with eye tracking features usually comprises an eye tracking sensor (such as an imaging device or any other suitable sensor), a processor, and a memory containing instructions executable by the processor. These features are well-known for one of ordinary skills.

Figure 7:
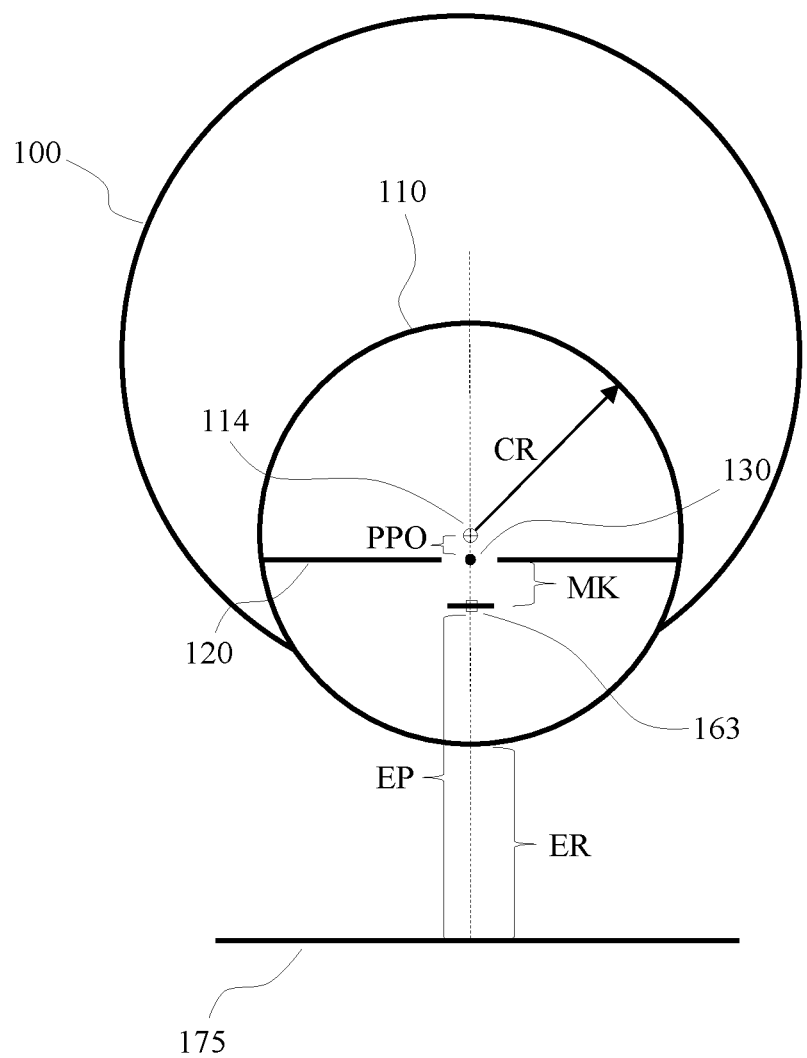
FIG. 7 is a schematic illustration of a procedure determining an eye relief according to one embodiment of the present invention.

According to embodiments of the invention the viewpoint-adjusted entrance pupil position 163 is utilized to provide an estimate of the eye relief and also using the estimate of the eye relief. The eye relief may for example be utilized to affect the generation of the image and to affect the distance between the eye and the display. The embodiments will be described with reference to the schematic illustration of FIG. 7, showing a typical eye 100 in front of a display 175. FIG. 7 shows a determined eye relief ER, as the distance from the cornea 110 to the display 175.

A number of parameters are required for the estimate of the eye relief, parameters that may be provided by existing eye tracking systems and methods. The optical axis of the eye is an imagined line through the eye around which there is the largest degree of rotational symmetry. The line passes through the cornea sphere center, the anatomical pupil, the entrance pupil center when viewed along the optical axis, and the top surface of the cornea. In Pupil Center Corneal Reflection, PCCR, eye tracking, the locations of corneal reflections (glints) determine the center, CC, of a corneal sphere, shown in FIG. 7 as 114. The anatomical pupil position 130, RPP, is determined by the pupil location in the image, the cornea center, a fixed cornea radius, CR, optical properties of the cornea, and an individually calibrated distance from the cornea center to the anatomical pupil along the optical axis known as the pupil-plane offset, PPO. The visual axis, or gaze, is calculated from the optical axis by adjusting it according to individually calibrated foveal offset angles that describe the person's fovea relative to the optical axis. For illustrative purposes only, determination of the eye relief, ER, is described in a simplified one-dimensional coordinate system that describes distances along the eye optical axis. The calculation of the eye relief, ER, described for the one-dimensional case above may be extended to similar calculation in a three-dimensional coordinate system, which will be apparent to a skilled person. Starting with the viewpoint-adjusted entrance pupil position 163, providing a distance EP obtained using any of the above-described embodiments, the eye relief, ER, may be determined in a following manner (eq. 1):

$$ER = EP - MK - PPO + CR \qquad \text{eq. 1}$$

wherein EP is viewpoint-adjusted entrance pupil position in relation to the display 175, CR is a fixed cornea radius for a typical eye 100, PPO is the individually calibrated pupil plane offset, MK is an offset from a viewpoint-adjusted entrance pupil to the anatomical pupil offset for a typical eye.

Alternatively, the calculation of the eye relief, ER, may be based on a model $f$, CR=$f$(EP, RPP), that describes the cornea radius, CR, as a function of the relation between viewpoint-adjusted entrance pupil position, EP, and anatomical pupil position, RPP, determined from PCCR or other eye tracking methods for a typical eye. The model f may for example be derived from measurements of real eyes that captures the refractive properties of the cornea in an aggregated sense for a population, such as e.g., a refractive spherical surface. Hence, the ER may be calculated according to eq. 2 as follows:

$$ER = CC + CR \text{ being equal to } ER = CC + f(EP, RPP) \qquad \text{eq. 2}$$

Figure 8A:
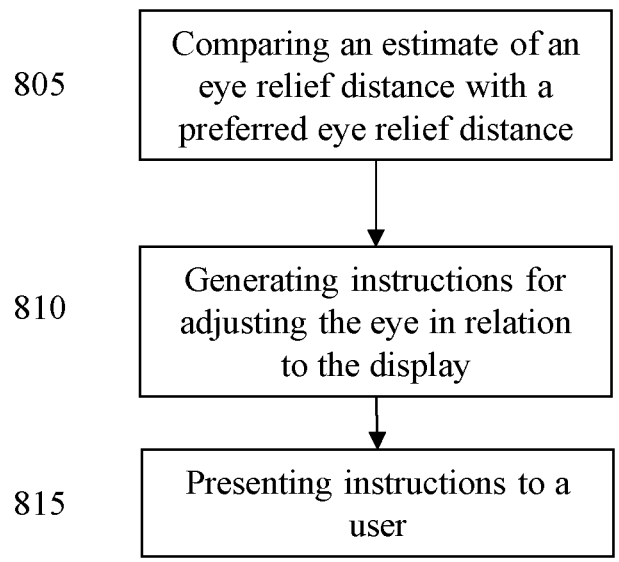
FIG. 8a-b are flowcharts of the method according to two alternative embodiments of the present invention.

According to one embodiment, illustrated in the flowchart of FIG. 8*a*, a preferred eye relief distance has been provided in the eye tracking system and the method comprises the further steps of:

805: Comparing the estimate of the eye relief distance determined using the viewpoint-adjusted entrance pupil position 163 with the preferred eye relief distance.

810: Generating instructions for adjusting the eye in relation to the display in order to approach the preferred eye relief distance.

815: Presenting the instructions to the user in the form of a visual guide.

The visual guide may be in a form of a text, for example by showing a value of either current or the preferred eye relief distance, or by graphical representation, for example by instructing the user to move the headset closer or further away in relation to an eye. The preferred eye relief distance is understood as an ideal position or a range of ideal positions of the distances between the top of the cornea and the screen or other last surface of an optical assembly of a headset. In a non-limiting example, the preferred eye relief distances may be in a range between 10-20 mm. The preferred eye relief distance may be exclusively assigned for each of the headsets meaning that each headset has a unique preferred eye relief distance or alternatively, some average preferred eye relief may be used according to the requirements set by a skilled person.

Figure 8B:
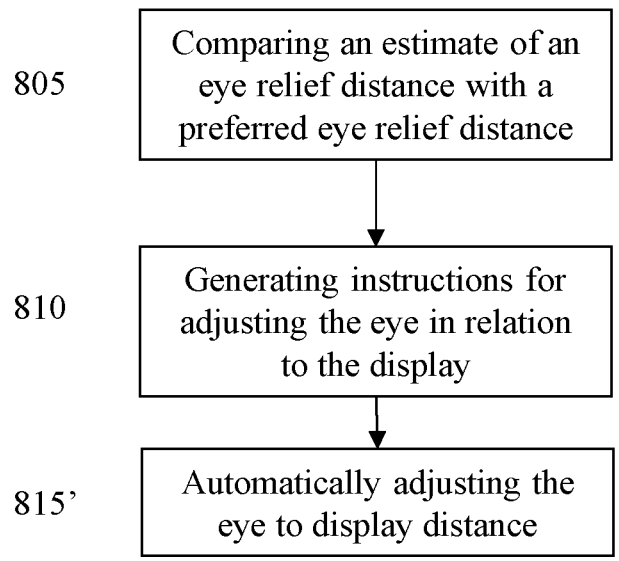

According to an alternative embodiment, illustrated in the flowchart of FIG. 8b, a preferred eye relief distance has been provided in the eye tracking system and the method comprises the steps 805 and 810 as discussed in relation to FIG. 8a with a further alternative step 815' of:

815': Automatically adjusting the eye-to-display distance.

According to embodiments the determined eye relief distance is used for example to affect the generation of the image and to affect the distance between the eye and the display or to provide information regarding the user's distance from the display, such that the corresponding distance utilized with/in connection to the virtual cameras for rendering virtual content matches the physical distance, in terms of eye relief, for a specific user. The invention provides the advantages of minimizing depth distortion, allowing the user to perceive the virtual content at the intended scale and reducing misalignment of virtual and real world in AR systems.

According to an embodiment, the determined eye relief distance may be used for example, for a purpose of foveated rendering in an eye tracking system. Foveated rendering is known to provide for a reduced computation costs while maintaining eye tracking performance.

The methods, systems and implementations discussed above depend on the entrance pupil displacement model providing a sufficiently accurate adjustments of the entrance pupil position, the advantages of which are not repeated further for brevity. Reliable data is required to verify the entrance pupil displacement model and the algorithms utilizing the same. This data will be referred to as 3D entrance pupil location ground truth data or shortened: "ground truth data". The ground truth data should comprise true real location of the entrance pupil and its associated viewpoint, and also further information of the camera, its pose and projective properties as well as the actual image. It is difficult to collect this ground truth data on real human subjects for a specific reason. Being a virtual point, the entrance pupil is not readily measurable in a lab or clinical setting. Wavefront sensing techniques can be used to estimate its location, but these techniques come with excessive cost and impracticalities. Therefore, there is a need to provide for alternatives to impractical measurements on human eyes and computational methods that are able to mitigate such problems are of great interest. A suitable approach to generate the ground truth data may be based at least on the following two components:

A Statistical Eye Model that reflects the variability of a human population that is sampled to generate random eye biometric data. A suitable model is known as "SyntEyes" and presented in Rozema, Jos J et al. "*SyntEyes: A Higher-Order Statistical Eye Model for Healthy Eyes.*" Investigative ophthalmology & visual science vol. 57,2 (2016): 683-91. Doi:10.1167/ iovs.15-18067 and is essentially a statistical model of the healthy cornea surface along with elements from the eye model of "Navarro".

A synthetic eye image model. An artificial or synthetic eye image can be provided as a metal disc with a highly absorptive aperture that represents the pupil covered with a spherical glass object that represents the cornea. The iris and sclera can be painted to represent the typical reflective behaviour of those parts of the eye. A suitable synthetic eye image model could combine for example, an image of both eyes of a user with or without a face shape model, account for a configurable illumination, camera setup and the statistical eye model and create scenes that are rendered resulting in randomized synthetic eye images with ground truth camera parameters and eye geometry.

One example of using these components to determine the entrance pupil center by ray tracing may include:

1. Sampling the statistical eye model to generate a random eye geometry, and in particular a random cornea surface.
2. Knowing the location and refractive properties of the optical elements of the eye modelled in the Statistical Eye Model, rays are shot from the chosen viewpoint and refracted through the modelled cornea surface. The ray closest to the physical pupil aperture center may be determined by employing sequential quadratic programming which is an iterative nonlinear optimization technique. The synthetic eye image model may define the cornea as a single refractive surface with a constant refractive index.
3. Creating a bundle of rays through the pupil aperture center by displacing the location of the viewpoint, in a non-limiting example of about 0.2 mm, in different directions and then repeating step 2 above.
4. Calculating the entrance pupil location as the intersection of the rays in the bundle in a least-square sense.
5. The synthetic eye image model is used to generate a randomized face geometry in a face shape model. The random eye geometry and the calculated entrance pupil center location is combined with the face geometry and rendered from a known camera position. The resulting image, the entrance pupil, camera pose, and camera parameters are combined to form a synthetic ground truth data point. The sequence is repeated to generate additional data points to form a data set.

There may be provided a computer program, which when run on a computer, causes the computer to configure any apparatus, including a controller, system, or device disclosed herein or perform any method or algorithm disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device or may be embodied as a transient signal. Such a transient signal may be a network download, including an internet download. There may be provided one or more non-transitory computer-readable storage media storing computer-executable instructions that, when executed by a one or more control and processing unit(s), causes to execute a method of determining an entrance pupil position in an eye of a user of an eye tracking system, the steps of any method disclosed herein. According to one aspect of the invention, a non-transitory computer readable medium is provided.

The embodiments described above are to be understood as illustrative examples of the system and method of the present invention. It will be understood that those skilled in the art that various modifications, combinations and changes may be made to the embodiments. In particular, different part solutions in the different embodiments can be combined in other configurations, where technically possible.

The invention claimed is:

1. A method of determining an entrance pupil position of an eye of a user of an eye tracking system, the eye tracking system comprising at least a first camera arranged to provide an image of the eye, the method comprises the steps of:
   determining an optical axis of the eye;
   receiving an image from the first camera;
   detecting an image pupil center from the received image;
   determining a first estimate of the entrance pupil position in the eye using the detected image pupil center;
   selecting a virtual viewpoint; and
   calculating a viewpoint-adjusted entrance pupil position relating to the selected virtual viewpoint using at least the first estimate of the entrance pupil position, the optical axis of the eye and a predetermined entrance pupil displacement model, wherein the entrance pupil displacement model at least models the angular dependence of the refractive properties of a cornea of the eye and the predetermined entrance pupil displacement model in addition to modelling the angular dependence of the refractive properties of the cornea is further based on at least one of, or a combination of: variations in the cornea topography or radius; pupil size; changing accommodation; and pupil plane offset.

2. The method according to claim 1, wherein in the step of determining the first estimate of the entrance pupil position comprises constructing a first camera ray from a first camera center through the entrance pupil as seen from the first camera by back projecting the detected image pupil center.

3. The method according to claim 2, wherein the eye tracking system further comprises a second camera, the method comprises the steps of:
   receiving a first image from the first camera and receiving a second image from the second camera;
   detecting a first image pupil center from the received first image and detecting a second image pupil center from the received second image;
   determining a first estimate of the entrance pupil position using the first image pupil center and determining a second estimate of the entrance pupil position using the second image pupil center; and
   calculating the viewpoint-adjusted entrance pupil position using the first and second estimates of the entrance pupil position, the optical axis of the eye and the predetermined entrance pupil displacement model.

4. The method according to claim 3, wherein the step of determining a first and second estimate of the entrance pupil position comprises:
   constructing a first camera ray associated with the first camera; and
   constructing a second camera ray associated with the second camera, the rays constructed from the respective camera center through the entrance pupil as seen from respective camera by back projecting the image pupil center; and
   wherein the step of calculating the viewpoint-adjusted entrance pupil position comprises the substeps of:
   introducing a first virtual camera associated with the first camera and/or introducing a second virtual camera associated with the second camera;
   determining a virtual camera ray being one or both of the first and second camera rays displaced a first distance, $d_0$, $d_1$, respectively, wherein the first distance ($d_0$, $d_1$) is determined using the predetermined entrance pupil displacement model;
   reconstructing the entrance pupil as seen from the first camera using the intersection between the first camera ray and the second virtual camera ray and/or reconstructing the entrance pupil as seen from the second camera using the intersection between the first camera ray and the first virtual camera ray, the displacement corresponding to the translation of the entrance pupil in changing the viewpoint between the first and the second cameras; and
   calculating the viewpoint-adjusted entrance pupil position by adjusting the reconstructed entrance pupil with either one or both of a second distance, $a_0$, $a_1$, respectively, wherein the second distance is a relative displacement of the entrance pupil changing the viewpoint associated with the first camera or changing the entrance pupil in respect to viewpoint associated with the second camera to the selected viewpoint, the second distance ($a_0$, $a_1$) determined using the predetermined entrance pupil displacement model.

5. The method according to claim 1, wherein step of determining a first estimate of the entrance pupil position comprises:
   constructing a first camera ray associated with the first camera, the ray constructed from the first camera center through the entrance pupil as seen from first camera by back projecting the image pupil center; and wherein the step of calculating the viewpoint-adjusted entrance pupil position comprises the substeps of:
   introducing at least a first virtual camera associated with the first camera;
   determining a second virtual camera ray being the optical axis displaced;
   constructing a first virtual camera ray, the ray constructed from the first virtual camera displaced a first distance, $d_0$, from the first camera ray, if viewed from the perspective of the optical axis, wherein the first distance, $d_0$, correspond to a translation of the entrance pupil in changing the viewpoint from the first camera to a position along the optical axis, wherein further the first distance, $d_0$, is determined using the predetermined entrance pupil displacement model;
   reconstructing the entrance pupil as seen from the perspective of the second virtual camera ray using the intersection between the first virtual camera ray and the second virtual camera ray; and
   calculating (a viewpoint-adjusted entrance pupil position by adjusting the reconstructed the entrance pupil as if viewed from the selected viewpoint, using the predetermined entrance pupil displacement model.

6. The method according to claim 1, wherein the viewpoint-adjusted entrance pupil position is utilized in image generation for adjusting the position of a virtual camera used in 3D rendering in an extended reality, XR, application, such as virtual or augmented reality application(s).

7. The method according to claim 1, wherein the viewpoint-adjusted entrance pupil position is utilized in adjusting at least one parameter in an adjustable optical device used in combination with the eye tracking system.

8. The method according to claim 1, wherein the viewpoint-adjusted entrance pupil position is utilized as an input for a further processing of an eye tracking signal.

9. The method according to claim 1, further comprising the step of determining an eye relief distance using the viewpoint-adjusted entrance pupil position, the eye relief distance being the shortest distance between the part of the cornea being closest to a display and the display.

10. The method according to claim 9, wherein a preferred eye relief distance has been provided in the eye tracking system and the method comprises the further steps of:
comparing the estimate of the eye relief distance determined using the viewpoint-adjusted entrance pupil position with the preferred eye relief distance;
generating instructions for adjusting the eye in relation to the display in order to approach the preferred eye relief distance; and
presenting the instructions to the user in the form of a visual guide.

11. The method according to claim 9, wherein a preferred eye relief distance has been provided in the eye tracking system and the method comprises the further steps of:
comparing the estimate of the eye relief distance determined using the viewpoint-adjusted entrance pupil position with the preferred eye relief distance;
generating instructions for adjusting the eye in relation to the display in order to approach the preferred eye relief distance; and
automatically adjusting the eye-to-display distance.

12. An eye tracking system arranged to detect the motion of an eye of a user, the eye tracking system comprising at least a first camera arranged to provide an image of the eye to a control and processing unit and a control and processing unit comprising a processor and a memory, the memory storing executable instructions that, when executed by the processor, cause the processor to:
determine the entrance pupil position in the eye;
determine an optical axis of the eye;
receive an image from the first camera;
detect an image pupil center from the received image;
determine a first estimate of the entrance pupil position in the eye using the detected image pupil center;
select a virtual viewpoint; and
calculate a viewpoint-adjusted entrance pupil position relating to the selected virtual viewpoint using at least the first estimate of the entrance pupil position, the optical axis of the eye and a predetermined entrance pupil displacement model, wherein the entrance pupil displacement model at least models the angular dependence of the refractive properties of a cornea of the eye and wherein the predetermined entrance pupil displacement model in addition to modelling the angular dependence of the refractive properties of the cornea is further based on at least one of, or a combination of: variations in the cornea topography or radius; pupil size; changing accommodation; and pupil plane offset.

13. The eye tracking system according to claim 12, wherein the determination of the first estimate of the entrance pupil position comprises constructing a first camera ray from a first camera center through the entrance pupil as seen from the first camera by back projecting the detected image pupil center.

14. The eye tracking system according to claim 13, wherein the eye tracking system further comprises a second camera, and wherein the control and processing unit is further configured to:
receive a first image from the first camera and receive a second image from the second camera;
detect a first image pupil center from the received first image and detect a second image pupil center from the received second image;
determine a first estimate of the entrance pupil position using the first image pupil center and determining a second estimate of the entrance pupil position using the second image pupil center; and
calculate the viewpoint-adjusted entrance pupil position using the first and second estimates of the entrance pupil position, the optical axis of the eye and the predetermined entrance pupil displacement model.

15. The eye tracking system according to claim 13, wherein the control and processing unit is further configured, in the step of determination of a first and second estimate of the entrance pupil position, to:
construct a first camera ray associated with the first camera; and
construct a second camera ray associated with the second camera, the rays constructed from the respective camera center through the entrance pupil as seen from respective camera by back projecting the image pupil center; and wherein in the step of calculation of the viewpoint-adjusted entrance pupil position, the control and processing unit is further configured to:
introduce a first virtual camera associated with the first camera and/or introduce a second virtual camera associated with the second camera;
determine a virtual camera ray being one or both of the first and second camera rays displaced a first distance, $d_0$, $d_1$, respectively, wherein the first distance $d_0$, $d_1$ is determined using the predetermined entrance pupil displacement model;
reconstruct the entrance pupil as seen from the first camera using the intersection between the first camera ray and the second virtual camera ray and/or reconstruct the entrance pupil as seen from the second camera using the intersection between the first camera ray and the first virtual camera ray, the displacement corresponding to the translation of the entrance pupil in changing the viewpoint between the first and the second cameras; and
calculate the viewpoint-adjusted entrance pupil position by adjusting the reconstructed entrance pupil with either one or both of a second distance, $a_0$, $a_1$, respectively, wherein the second distance is a relative displacement of the entrance pupil changing the viewpoint associated with the first camera or changing the entrance pupil in respect to the viewpoint associated with the second camera to the selected viewpoint, the second distance $a_0$, $a_1$ determined using the predetermined entrance pupil displacement model.

16. The eye tracking system according to claim 13, wherein the control and processing unit is further configured, in the step of determining a first estimate of the entrance pupil position, to:
construct a first camera ray associated with the first camera, the ray constructed from the first camera center through the entrance pupil as seen from first camera by back projecting the image pupil center; and wherein, in the step of calculating the viewpoint-adjusted entrance pupil position the control and processing unit is further configured to:
introduce at least a first virtual camera associated with the first camera;
determine a second virtual camera ray being the optical axis;
construct a first virtual camera ray, the ray constructed from the first virtual camera displaced a first distance, $d_0$, from the first camera ray, if viewed from the perspective of the optical axis, wherein the first distance, $d_0$, corresponds to a translation of the entrance pupil in changing the viewpoint from the first camera to a position along the optical axis, wherein further the first distance, $d_0$, is determined using the predetermined entrance pupil displacement model;

reconstruct the entrance pupil as seen from the perspective of the second virtual camera ray using the intersection between the first virtual camera ray and the second virtual camera ray; and calculate a viewpoint-adjusted entrance pupil position by adjusting the reconstructed the entrance pupil as if viewed from the selected viewpoint, using the predetermined entrance pupil displacement model.

17. The eye tracking system according to claim 12, wherein the control and processing unit is further configured to determine an eye relief distance using the viewpoint-adjusted entrance pupil position, the eye relief distance being the shortest distance between the part of the cornea being closest to a display and the display.

18. A head mountable display suitable for extended reality, XR, applications comprising the eye tracking system according to claim 12.

19. A non-transitory computer readable medium having stored thereon instructions that, when executed by one or more control and processing unit(s), cause the one or more control and processing unit(s) to execute a method of determining an entrance pupil position of an eye of a user of an eye tracking system, the eye tracking system comprising at least a first camera arranged to provide an image of the eye, the method comprising the steps of:

determining an optical axis of the eye;
receiving an image from the first camera;
detecting an image pupil center from the received image;
determining a first estimate of the entrance pupil position in the eye using the detected image pupil center;
selecting a virtual viewpoint; and
calculating a viewpoint-adjusted entrance pupil position relating to the selected virtual viewpoint using at least the first estimate of the entrance pupil position, the optical axis of the eye and a predetermined entrance pupil displacement model, wherein the entrance pupil displacement model at least models the angular dependence of the refractive properties of a cornea of the eye and the predetermined entrance pupil displacement model in addition to modelling the angular dependence of the refractive properties of the cornea is further based on at least one of, or a combination of: variations in the cornea topography or radius; pupil size; changing accommodation; and
pupil plane offset.

\* \* \* \* \*